United States Patent [19]
Weng

[11] Patent Number: 5,597,053
[45] Date of Patent: Jan. 28, 1997

[54] BRAKE LINING HAVING INSERTS OF CHALK INFILTRATED WITH ROSIN

[76] Inventor: Dah-cherng Weng, No. 12, Lane 40, Sec. 3, Chihnan Rd., Taipei, Taiwan

[21] Appl. No.: 572,426

[22] Filed: Dec. 14, 1995

[51] Int. Cl.⁶ ................................................ F16D 69/00
[52] U.S. Cl. ................ 188/256; 188/251 A; 188/250 G; 188/257
[58] Field of Search .................... 188/251 R, 251 A, 188/250 R, 256, 257, 250 G, 251 M, 250 B; 192/107 M

[56] References Cited

U.S. PATENT DOCUMENTS

| | | | |
|---|---|---|---|
| 995,067 | 6/1911 | Jones | 188/256 |
| 1,143,518 | 6/1915 | Duschnitz | 188/256 X |
| 1,239,448 | 9/1917 | Armbrust | 188/256 X |
| 1,670,224 | 5/1928 | Watson | 188/256 X |
| 4,273,219 | 6/1981 | Ito | 188/256 |

FOREIGN PATENT DOCUMENTS 25392  3/1931  Australia .................... 188/251 A

*Primary Examiner*—Peter M. Poon
*Attorney, Agent, or Firm*—Hedman, Gibson & Costigan P.C.

[57] ABSTRACT

A brake lining comprises a lining body defining a plurality of holes therein and a plurality of blocks made of certain material, each block disposed in a respective hole of the lining body, whereby, a coated layer is formed on the brake disk when the brake lining is urged against a brake disk to protect the surface of the brake disk from abrasion. The holes of the lining body can be circular and the blocks can be made to match the holes. In a preferred embodiment, the disposition of the holes is to extend along a friction path between the brake lining and the brake disk. Also the disposition of the holes is to stagger the holes at the edges thereof along the friction path between the brake lining and the brake disk.

6 Claims, 3 Drawing Sheets

# BRAKE LINING HAVING INSERTS OF CHALK INFILTRATED WITH ROSIN

BACKGROUND OF THE INVENTION

1. Field of The Invention

The present invention relates to a brake lining, and more particularly to a brake lining having a plurality of blocks disposed thereon to coat on the brake disk to increase the friction factor.

2. Description of Related Art

A brake system of an automobile is considered as the most important item of safety equipment on there. Generally, brake systems fall into two kinds, a disk brake and a drum brake. In spite of the different structures of the two kinds, the function of the brake is achieved by means of a friction force resulting from a brake lining fixed on one side of a brake block rubbing against the metal surface of a brake disk or a brake drum. Obviously, the brake lining is subjected to wear over a period of time. A conventional brake lining has a structure as shown in FIG. 5 (illustrated by a disk brake as an example), the brake lining includes a lining body 91 fixedly disposed on a plate 90 so as to provide a friction force when applied by a hydraulic force or mechanical force and urged against the surface of the brake disk. However, this kind of brake lining will become abraded after a long time of use and cause the friction factor to decrease, thus, the effectiveness of brake and safety are both reduced.

The present invention therefore is aimed to provide an improved brake lining to mitigate and/or obviate the aforementioned problems.

SUMMARY OF THE INVENTION

One object of the present invention is to provide an improved brake lining having a plurality of blocks disposed in corresponding holes on the surface thereof for coating a brake disk with certain material, thereby to increase the friction factor between the surface of the brake lining and brake disk and to prolong the service life of the brake.

In accordance with one aspect of the present invention, the brake lining comprises a lining body defining a plurality of holes thereon and a plurality of blocks made of certain material, each disposed in a corresponding hole of the lining body, whereby, a coated layer is formed on the brake disk when the brake lining is urging against a brake disk.

In accordance with another aspect of the present invention, the holes defined in the lining body are circular and the blocks are sized and shaped to match the holes.

In accordance with a further aspect of the present invention, the disposition of the holes is to extend along a friction path between the brake lining and the brake disk.

In accordance with still a further aspect of the present invention, the disposition of the holes is to stagger them along the friction path between the brake lining and the brake disk.

Other objects, advantages, and novel features of the invention will become more apparent from the following detailed description when taken in conjunction with the accompanying drawings.

DESCRIPTION OF THE PREFERRED EMBODIMENT

Figure 1:
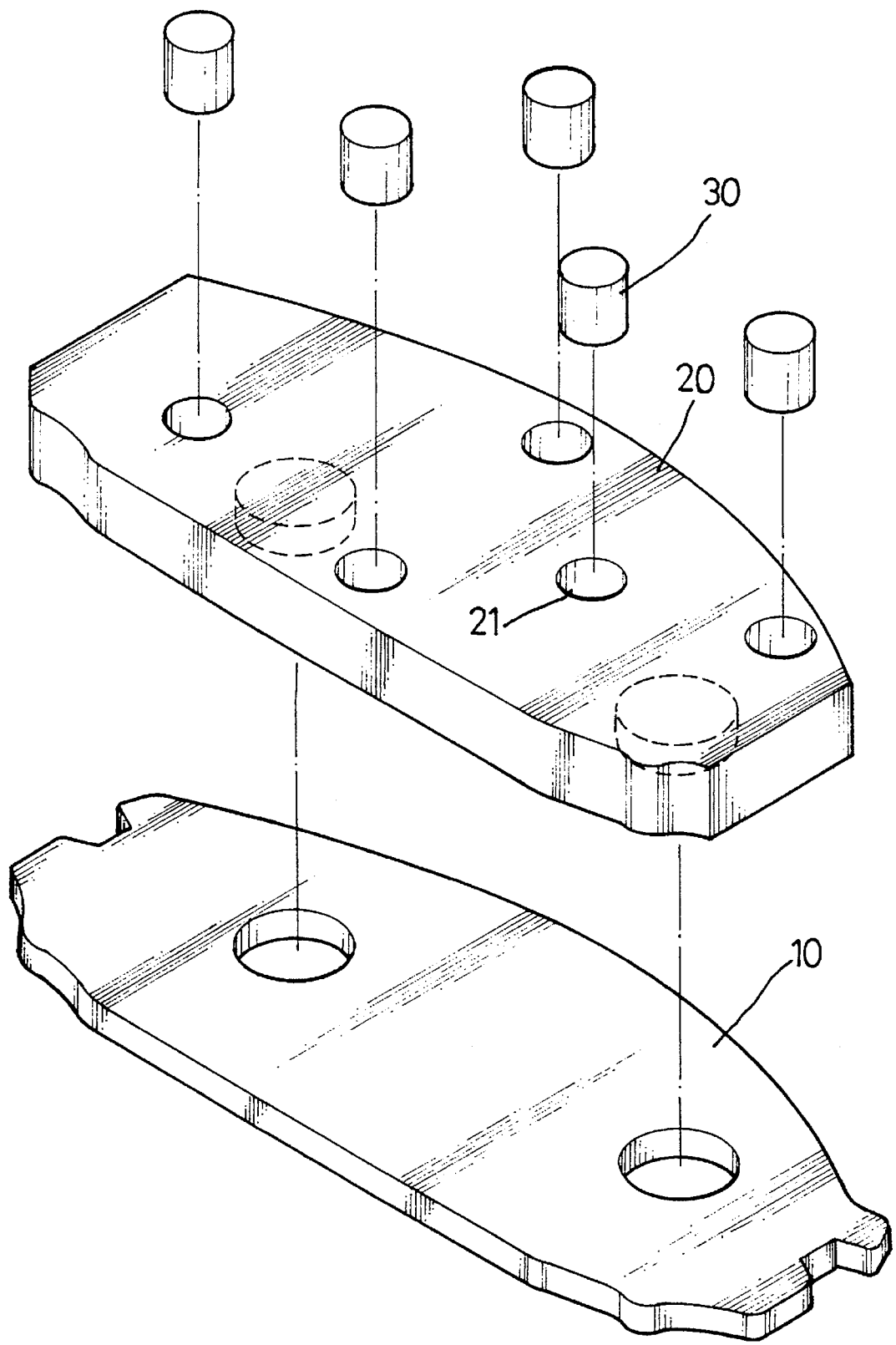
FIG. 1 is an exploded view showing the components of a preferred embodiment in accordance with the present invention.

FIG. 1, shows components of a preferred embodiment in accordance with the present invention. Herein a brake block of the disk brake is provided as an example. The brake block is composed of a plate 10 and a brake lining attached thereto by two rivets (not numbered). The brake lining includes a lining body 20 defining a plurality of holes 21 therein and a plurality of blocks 30 with a height substantially the same as that of the holes 21, each block being disposed in a corresponding hole 21 of the lining body 20, whereby, a coated layer is to be formed on metal surface of the disk brake when the brake lining is urging against the disk brake at the time of braking of the vehicle.

The holes 21 of the lining body 20 can be circular in periphery and the blocks can be made to match the holes. Various other designs of the shapes of the holes can be adopted for the same purpose. The blocks 30 can be made of thermostable wax or similar materials. In such embodiment, a block of chalk cut to a proper specification is immersed into rosin which is prior heated into liquid, then the chalk infiltrated by the rosin is cooled to form the desired block 30. It is understood that the present invention can significantly decrease the abrasion between the brake disk or brake drum and the brake lining without reducing the effectiveness of brake. Furthermore, selective material used to form the desired block 30 enables the friction factor on the metal surface of the brake disk to be increased so as to assure the safety of driving.

Figure 2:
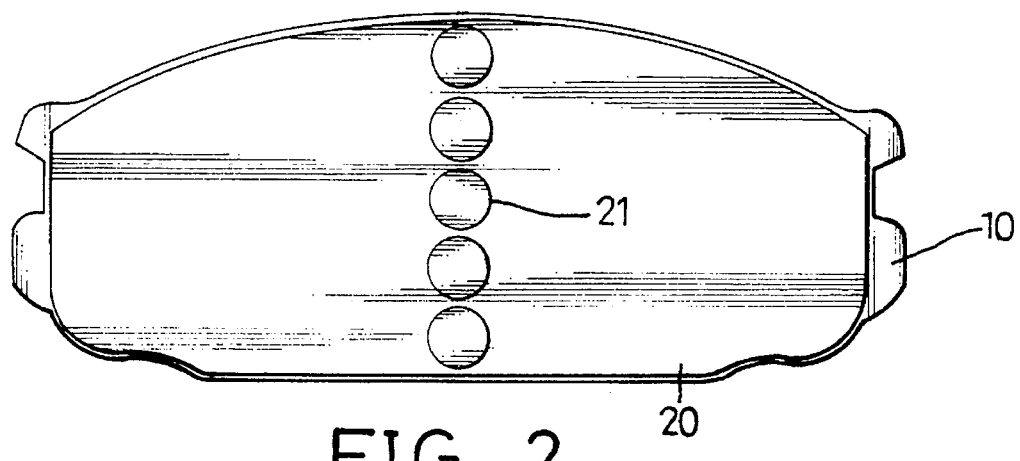
FIG. 2 is a plan view showing a further preferred embodiment of a disposition of the holes in accordance with the present invention.
Figure 3:
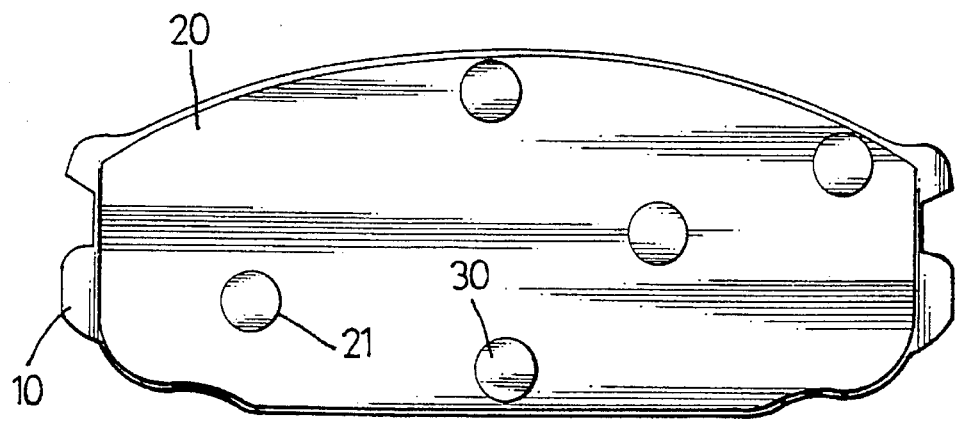
FIG. 3 is a top plan view of FIG. 1 when the components are assembled together.
Figure 4:
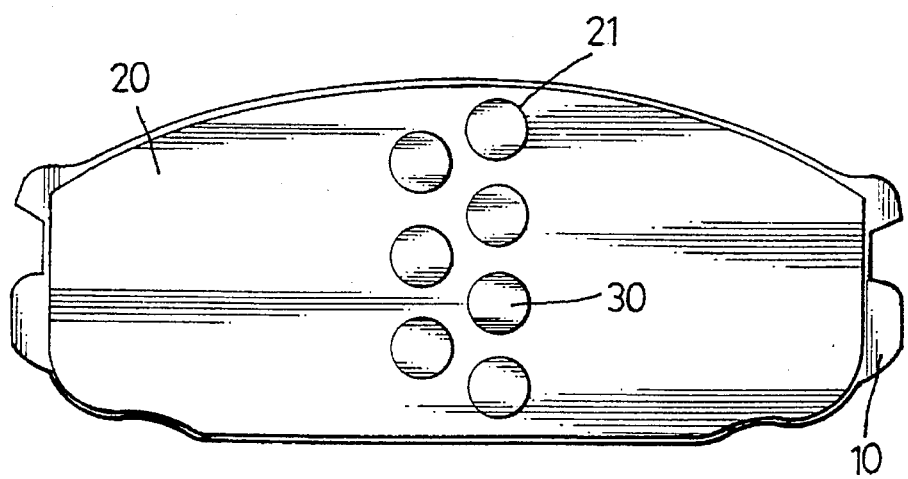
FIG. 4 is a plan view showing another preferred embodiment of the disposition of the holes in accordance with the present invention.
Figure 5:
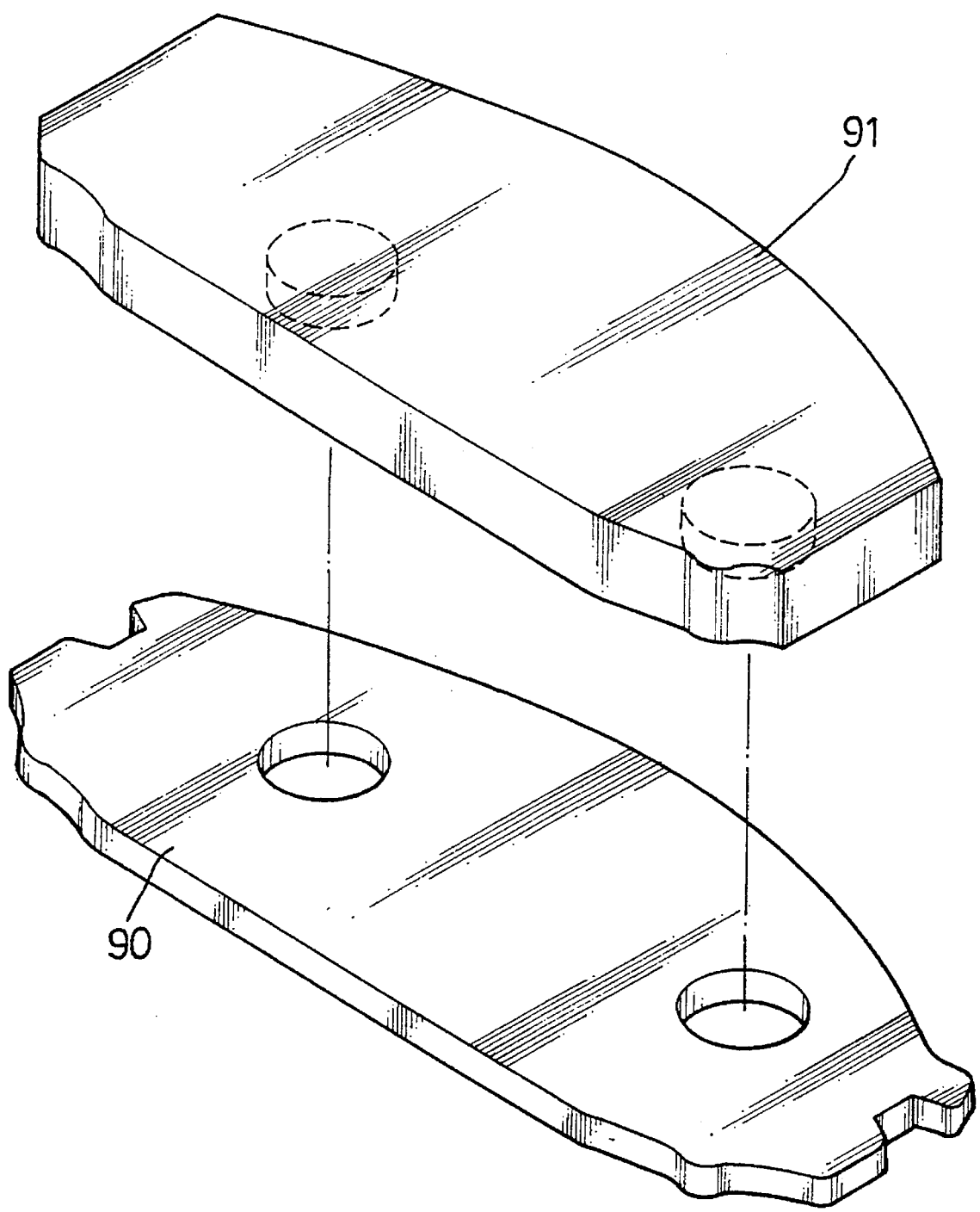
FIG. 5 is an exploded view showing the components of a conventional brake block.

FIG. 2 shows a further preferred embodiment of a disposition of the holes in accordance with the present invention. In such an embodiment, the disposition of the holes 21 is extended in a line and transverse to a friction path of the brake lining in order to obtain the best effect of coating. To prevent disintegration of the lining body through weakening thereof by existence of the holes 21, the holes 21 are designed to be spread on the surface of the lining body, but still maintain the best effect of coating, as shown in FIG. 3. In another embodiment, the disposition of the holes 21 is extended in a staggered pattern and transverse to the friction path of the brake lining, as shown in FIG. 4. In FIG. 4, two parallel columns of holes 21 are provided. While in assembly, an arrangement by further reference to FIG. 3 can be used.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms on which the appended claims are expressed.

What is claimed is:

1. A brake lining comprising:

a lining body having a plurality of holes defined in a first face thereof, a second opposite face thereof being adapted to be coupled to a brake plate; and a plurality of blocks made of chalk infiltrated with rosin, each block having a height substantially the same as that of the lining body and being disposed in a corresponding one of the holes of the lining body, said blocks coating a surface of a disk of a disk brake in frictional contact therewith.

2. The brake lining as claimed in claim 1, wherein the holes of the lining body are of a circular cross-section and the blocks are sized and configured to be received in the holes.

3. The brake lining as claimed in claim 1, wherein the disposition of the holes is extended in a line transverse to a friction path of the brake lining.

4. The brake lining as claimed in claim 1, wherein the disposition of the holes is extended in a staggered pattern transverse to a friction path of the brake lining.

5. The brake lining as claimed in claim 1, wherein the disposition of the holes is spread on the lining body.

6. The brake lining as claimed in claim 1, wherein the chalk is infiltrated with rosin by immersing the chalk into rosin which is previously heated.

* * * * *